United States Patent
Wu et al.

(10) Patent No.: US 11,689,021 B2
(45) Date of Patent: Jun. 27, 2023

(54) POWER GRID REACTIVE VOLTAGE CONTROL MODEL TRAINING METHOD AND SYSTEM

(71) Applicant: TSINGHUA UNIVERSITY, Beijing (CN)

(72) Inventors: Wenchuan Wu, Beijing (CN); Haotian Liu, Beijing (CN); Hongbin Sun, Beijing (CN); Bin Wang, Beijing (CN); Qinglai Guo, Beijing (CN); Tian Xia, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 418 days.

(21) Appl. No.: 17/025,154

(22) Filed: Sep. 18, 2020

(65) Prior Publication Data
US 2021/0359517 A1    Nov. 18, 2021

(30) Foreign Application Priority Data
May 15, 2020    (CN) .......................... 202010413883.4

(51) Int. Cl.
*H02J 3/18* (2006.01)
*G06F 30/20* (2020.01)

(52) U.S. Cl.
CPC ................ *H02J 3/18* (2013.01); *G06F 30/20* (2020.01); *H02J 2203/20* (2020.01)

(58) Field of Classification Search
CPC .... H02J 3/18; H02J 2203/20; H02J 13/00001; H02J 3/001; G06F 30/20; G06F 2113/04; G06F 30/27; Y02E 40/70; Y02E 60/00; Y02E 40/30; Y04S 10/40; Y04S 10/50; Y04S 40/20; G06N 3/045; G06N 3/08; G06Q 50/06; G09B 9/00
See application file for complete search history.

(56) References Cited

U.S. PATENT DOCUMENTS

2020/0327411 A1*  10/2020  Shi ........................ G06N 3/006

OTHER PUBLICATIONS

Yang, Qiuling, et al. "A Statistical Learning Approach to Reactive Power Control in Distribution Systems." arXiv preprint arXiv: 1910.13938 (2019). (Year: 2019).*

(Continued)

*Primary Examiner* — Bradley A Teets
*Assistant Examiner* — Pursottam Giri
(74) *Attorney, Agent, or Firm* — Grossman, Tucker, Perreault & Pfleger, PLLC

(57) ABSTRACT

A power grid reactive voltage control model training method. The method comprises: establishing a power grid simulation model; establishing a reactive voltage optimization model, according to a power grid reactive voltage control target; building interactive training environment based on Adversarial Markov Decision Process, in combination with the power grid simulation model and the reactive voltage optimization model; training the power grid reactive voltage control model through a joint adversarial training algorithm; and transferring the trained power grid reactive voltage control model to an online system. The power grid reactive voltage control model trained by using the method according to the present disclosure has transferability as compared with the traditional method, and may be directly used for online power grid reactive voltage control.

14 Claims, 3 Drawing Sheets

(56) References Cited

OTHER PUBLICATIONS

Cao, Junwei, et al. "Reactive power optimization for transient voltage stability in energy internet via deep reinforcement learning approach." Energies 12.8 (2019): 1556. (Year: 2019).*

Paul, Shuva, Zhen Ni, and Chaoxu Mu. "A learning-based solution for an adversarial repeated game in cyber-physical power systems." IEEE Transactions on Neural Networks and Learning Systems 31.11 (2019): 4512-4523 (Year: 2019).*

Liu, Xiaorui, and Charalambos Konstantinou. "Reinforcement learning for cyber-physical security assessment of power systems." 2019 IEEE Milan PowerTech. IEEE, 2019. (Year: 2019).*

* cited by examiner

POWER GRID REACTIVE VOLTAGE CONTROL MODEL TRAINING METHOD AND SYSTEM

This application claims priority of Chinese Patent Application entitled "Power Grid Reactive Voltage Control Model Training Method and System" filed to the Patent Office of China on May 15, 2020, with the Application No. 202010413883.4, the disclosure of which is incorporated herein by reference in its entirety.

TECHNICAL FIELD

The present disclosure belongs to a technical field of power system operation and control, and more particularly, relates to a power grid reactive voltage control model training method and system.

BACKGROUND

In recent years, with a continuously increased penetration rate of Distributed Generation (DG) devices, power grid control of new energy field stations and their aggregation regions thereof becomes increasingly important. As a flexible resource, DG usually has installed capacity greater than a rated active power thereof, and has a fast response speed, as well as a lot of adjustable space. With large scale DGs and reverse power flow, the operation of power grid is hindered by challenges such as severe voltage violations, DG tripping off and high network loss. To cope with such challenges, a power grid reactive voltage control system for DG has become a key measure. However, because a real physical system model of a power grid is hard to obtain, a traditional model-based optimizing method cannot guarantee a control effect, so there are frequently the cases where a control command is far from an optimal point, and the power grid operates in a sub-optimal state. Therefore, data-driven model-free optimizing methods, especially deep reinforcement learning methods that have developed rapidly in recent years, are important means for power grid reactive voltage control. However, data-driven deep reinforcement learning methods usually require a lot of online training, which not only incurs high training costs, but also leads to additional security risks.

In order to cope with the cost and safety problems caused by low efficiency of online training, a simulation model may be used in advance for offline training. However, since the offline model is not a power grid model of a real physical system, there is model deviation; and if a general deep reinforcement learning method is used, the offline model obtained by training has no transferability. This means that, when the model obtained by offline training is applied to an online system, there may be a problem of an unsatisfactory control effect in an initial stage. Therefore, it is necessary to study a power grid reactive voltage control model training method, to train a deep reinforcement learning model having transferability, which, thus, may be safely and efficiently applied to an online power grid reactive voltage control system, to avoid control deviation brought by model incompleteness, and meanwhile, save online training costs, and greatly improve safety and efficiency of online control.

SUMMARY

With respect to the above-described problems, the present disclosure provides a power grid reactive voltage control model training method, the method comprising:

establishing a power grid simulation model;

establishing a reactive voltage optimization model, according to a power grid reactive voltage control target;

building interactive training environment based on Adversarial Markov Decision Process, in combination with the power grid simulation model and the reactive voltage optimization model;

training the power grid reactive voltage control model through a joint adversarial training algorithm; and transferring the trained power grid reactive voltage control model to an online system.

Further, establishing a power grid simulation model comprises:

constructing, with respect to a regional power grid of n+1 nodes, an undirected graph as follows:

$$\Pi(N,E)$$

wherein, N is a set of power grid nodes; E is a set of power grid branches, $E=(i,j) \in N \times N$; and i, j are both power grid nodes.

Further, establishing a power grid simulation model further includes:

constructing a power flow equation of the power grid as follows:

$$P_{ij}=G_{ij}V_i^2-G_{ij}V_iV_j \cos \theta_{ij}-B_{ij}V_iV_j \sin \theta_{ij}, \forall ij \in E$$

$$Q_{ij}=-B_{ij}V_i^2+B_{ij}V_iV_j \cos \theta_{ij}-G_{ij}V_iV_j \sin \theta_{ij}, \forall ij \in E$$

$$\theta_{ij}=\theta_i-\theta_j, \forall ij \in E$$

wherein, $V_i, \theta_i$ are respectively a voltage amplitude and a phase angle of the power grid node i; $V_j, \theta_j$ are respectively a voltage amplitude and a phase angle of the power grid node j; $G_{ij}, B_{ij}$ are respectively conductance and susceptance of a power grid branch ij; $P_{ij}, Q_{ij}$ are respectively active power and reactive power of the power grid branch ij; and $\theta_{ij}$ is a phase angle difference of the power grid branch ij;

with respect to the power grid node $j \in N$, an expression of power thereof is as follows:

$$P_j = G_{sh,i}V_i^2 + \sum_{j \in K(i)} P_{ij} = \begin{cases} -P_{Dj}, j \in N \setminus N_{IB} \\ P_{Gj} - P_{Dj}, j \in N_{IB} \end{cases}$$

$$Q_j = -B_{sh,i}V_i^2 + \sum_{j \in K(i)} Q_{ij} = \begin{cases} -Q_{Dj}, j \in N \setminus \{N_{IB} \cup N_{CD}\} \\ Q_{Gj} - Q_{Dj}, j \in N_{IB} \\ Q_{Cj} - Q_{Dj}, j \in N_{CD} \end{cases}$$

wherein, $P_j, Q_j$ are respectively active power injection and reactive power injection of the power grid node j; $G_{sh,i}, B_{sh,i}$ are respectively ground conductance and susceptance of the power grid node i; $P_{Dj}, Q_{Dj}$ are respectively active power load and reactive power load of the power grid node j; $P_{Gj}, Q_{Gj}$ are respectively active power output and reactive power output based on a distributed generation device of the power grid node j; $Q_{Cj}$ is reactive power output based on a static var compensator of the power grid node j; $N_{IB}$ is a set of power grid nodes coupled to a distributed generation device in the power grid; $N_{CD}$ is a set of power grid nodes coupled to a static var compensator in the power grid; and K(i) is a set of correspondent nodes of all branches connected with the node i, $N_{IB} \cap N_{CD} = \emptyset$.

Further, the reactive voltage optimization model is as follows:

$$\min \sum_{j \in N} P_j$$

$$\text{s.t. } \underline{V_i} \leq V_i \leq \overline{V_i}, \forall i \in N$$

$$|Q_{Gi}| \leq \sqrt{S_{Gi}^2 - \overline{P_{Gi}}^2}, \forall i \in N$$

$$\underline{Q_{Ci}} \leq Q_{Ci} \leq \overline{Q_{Ci}}, \forall i \in N$$

wherein, $\underline{V_i}, \overline{V_i}$ are respectively a lower limit and an upper limit of a voltage of the power grid node i; $\underline{Q_{Ci}}, \overline{Q_{Ci}}$ are respectively a lower limit and an upper limit of reactive power output of a static var compensator of the power grid node i; and $S_{Gi}, \overline{P_{Gi}}$ are respectively distributed generation installed capacity and an active power output upper limit of the power grid node i.

Further, building interactive training environment based on Adversarial Markov Decision Process, specifically includes steps of:

A1: constructing an Adversarial Markov Decision Process state variable, an expression being as follows:

$$s = (P, Q, V, t)$$

wherein, P,Q are respectively power grid node active power and reactive power injection vectors; V is a power grid node voltage vector, and t is a time variable during training;

A2: constructing a feedback variable, an expression being as follows:

$$r_t = -\sum_{i \in N} P_i(t) - C_V \sum_{i \in N} \left[ ReLU^2(V_i(t) - \overline{V}) + ReLU^2(\underline{V} - V_i(t)) \right]$$

wherein, $C_V$ is a voltage suppression coefficient; and ReLU is a nonlinear function, which is defined as: ReLU(x)=max(0,x);

A3: constructing a reactive voltage control model action variable $a_p$, an expression being as follows:

$$a_p = (Q_G, Q_C)$$

wherein, $Q_G, Q_C$ are both reactive power output vectors;

A4: constructing an adversarial model action variable $a_o$, an expression being as follows:

$$a_o = (G, B)$$

wherein, G,B are respectively vectors composed of conductance and susceptance of all lines.

Further, training the power grid reactive voltage control model through a joint adversarial training algorithm, specifically comprises steps of:

B1: defining a reinforcement learning target function, an expression being as follows:

$$J = \sum_{t=0}^{\infty} \gamma^t (r_t + \alpha_p H(\pi_p(\cdot | s_t)) + \alpha_o H(\pi_o(\cdot | s_t)))$$

wherein, $\gamma$ is a reduction coefficient; $\alpha_p, \alpha_o$ are respectively maximum entropy multipliers of the reactive voltage control model and the adversarial model; $\pi_p$ is a reactive voltage control model policy; $\pi_o$ is an adversarial model policy; $\pi_p(\cdot|s_t), \pi_o(\cdot|s_t)$ are respectively a reactive voltage control model policy function and an adversarial model policy function, which are defined as action probability distribution in a state $s_t$, and are fitted by a deep neural network; and H is an entropy function;

B2: converting forms of the reactive voltage control model policy function and the adversarial model policy function, by using reparameterization trick, expressions being respectively as follows:

$$\tilde{a}_p^\theta(s, \xi_p) = \tan h(\mu_\theta(s) + \sigma_\theta(s) \Box \xi_p), \xi_p \sim N(0, I)$$

$$\tilde{a}_o^\omega(s, \xi_o) = \tan h(\mu_\omega(s) + \sigma_\omega(s) \Box \xi_o), \xi_o \sim N(0, I)$$

wherein, $\theta$ is a reactive voltage control model policy network parameter; $\omega$ is an adversarial model policy network parameter; $\mu_\theta(s)$ and $\sigma_\theta(s)$ are respectively a mean value and a variance function of the reactive voltage control model; $\mu_\omega(s)$ and $\sigma_\omega(s)$ are respectively a mean value and a variance function of the adversarial model; N (0,I) is a standard Gaussian distribution function; $\xi_p, \xi_o$ are respectively random variables of the reactive voltage control model and the adversarial model; and s is the Adversarial Markov Decision Process state variable;

B3: defining a joint adversarial value function network $Q_\phi^\pi(s, a_p, a_o)$, an expression being as follows:

$$Q_\phi^\pi(s, a_p, a_o) = \mathop{E}_{s', a_p', a_o'} [R(s, a_p, a_o, s') + \gamma(Q_\phi^\pi(s', a_p', a_o') - \alpha_p \log \pi_p(a_p' | s') - \alpha_o \log \pi_o(a_o' | s'))]$$

Where, s' is an Adversarial Markov Decision Process state variable at time t+1; $a'_p, a'_o$ are respectively action variables of the reactive voltage control model and the adversarial model at time t+1; $\pi_p(a'_p|s'), \pi_o(a'_o|s')$ are respectively a reactive voltage control model action probability value and an adversarial model action probability value at time t+1;

Calculating an estimated value of the joint adversarial value function network $Q_\phi^\pi(s, a_p, a_o)$ as follows:

$$y(r, s') = r + \gamma [Q_\phi^\pi(s', \tilde{a}_p', \tilde{a}_o') - \alpha_p \log \pi(\tilde{a}_p'|s') - \alpha_o \log \pi(\tilde{a}_o'|s')]$$

wherein, $\tilde{a}'_p, \tilde{a}'_o$ are respectively estimated action variables of the reactive voltage control model and the adversarial model at time t+1;

training the joint adversarial value function network $Q_\phi^\pi(s, a_p, a_o)$ by using an expression below:

$$\min(Q_\phi^\pi(s', \tilde{a}_p', \tilde{a}_o') - y)^2, \tilde{a}_p' \sim \pi_p(\cdot|s'), \tilde{a}_o' \sim \pi_o(\cdot|s')$$

where, $\phi$ represents parameters; $\pi_p(\cdot|s'), \pi_o(\cdot|s')$ are respectively a reactive voltage control model policy function and an adversarial model policy function at time t+1;

B4: training the reactive voltage control model policy network, an expression being as follows:

$$\max_\theta \min_\omega \mathop{E}_{\substack{s \sim D \\ \xi_p \sim N \\ \xi_o \sim N}} \left[ Q_\phi^\pi(s, \tilde{a}_p^\theta(s, \xi_p), \tilde{a}_o^\omega(s, \xi_o)) - \alpha_p \log \pi_p(\tilde{a}_p^\theta(s, \xi_p) | s) - \alpha_o \log \pi_o(\tilde{a}_o^\omega(s, \xi_o) | s) \right].$$

Further, an expression of the entropy function is as follows:

$$H(\pi(\cdot \mid s_t)) = \underset{a \sim \pi(\cdot \mid s_t)}{E}[-\log\pi(\cdot \mid s_t)].$$

Further, transferring the trained power grid reactive voltage control model to an online system, specifically comprises steps of:

C1: acquiring an optimal joint adversarial value function network $Q_\Phi^*$ and a current reactive voltage control model policy $\pi_p$;

C2: using an expression below:

$$Q_\Phi^*(s, a_p) = \underset{\xi_o \sim N}{E} Q_\phi^*(s, a_p, \tilde{a}_o^\omega(s, \xi_0))$$

to marginalize the joint adversarial value function network;

C3: deploying the reactive voltage control model policy $\pi_p$ formed by the marginalized joint adversarial value function network and the reactive voltage control model policy network to the online system;

C4: initializing the time variable t=0; initializing an experience library D=Ø, an expression of the experience library D being as follows:

$$D=\{(s_t,a_t^p,a_t^o,r_t,s_t')\}$$

wherein, $s_t$ is an Adversarial Markov Decision Process state variable at time t; $a_t^p$ of is a reactive voltage control model action variable at time t; $a_t^o$ is an adversarial model action variable at time t; $r_t$ is a feedback variable at time t; and $s_t'$ is an Adversarial Markov Decision Process state variable at time t+1.

Further, the method further comprises reactive voltage control model continuous online learning, which specifically comprises steps of:

S1: acquiring measured data from measuring apparatuses of the regional power grid to form a corresponding state variable $s_t$=(P,Q,V,t);

S2: extracting a set of experiences from the experience library, $D_B \in D$, where B is a quantity;

S3: updating the reactive voltage control model on $D_B$;

S4: generating an optimal action $a_t$ tan $h(\mu_\theta(s_t)+\sigma_\theta(s_t)\square\xi)=(Q_G,Q_C)$ at time t, by using the reactive voltage control model policy network;

S5: issuing the optimal action to a controlled device through a remote adjusting system;

S6: t=t+1, returning to step S1.

The present disclosure further provides a power grid reactive voltage control model training system, the system comprising:

A simulation model module, configured to establish a power grid simulation model;

An optimization model module, configured to establish a reactive voltage optimization model, according to a power grid reactive voltage control target;

A training environment building module, configured to build interactive training environment based on Adversarial Markov Decision Process, in combination with the power grid simulation model and the reactive voltage optimization model;

A training module, configured to train the power grid reactive voltage control model through a joint adversarial training algorithm; and A transferring module, configured to transfer the trained power grid reactive voltage control model to an online system.

The power grid reactive voltage control model trained by using the method according to the present disclosure has transferability as compared with the traditional method. The present disclosure only needs the power grid simulation model, and the model obtained by training may be directly used for online power grid reactive voltage control. Since the model has mastered basic operation rules of the power grid in advance, there is no need to make a wide range of tentative adjusting actions on the actual physical system, which further saves high online training costs. As compared with the existing power grid optimizing method based on reinforcement learning, the online control training according to the present disclosure has costs and safety hazards greatly reduced, and is more suitable for deployment in the actual power grid system.

The transferable model trained by the present disclosure not only can be directly deployed in the power grid reactive voltage control system, but also can continuously mine control process data online to adapt to model changes of the power grid, which, thus, ensures effectiveness of power grid reactive voltage control commands, and improves efficiency and safety of power grid operation.

Other features and advantages of the present disclosure will be further explained in the following description, and partly become self-evident therefrom, or be understood through implementation of the present disclosure. The objectives and other advantages of the present disclosure will be achieved through the structure specifically pointed out in the description, claims, and the accompanying drawings.

BRIEF DESCRIPTION OF THE DRAWINGS

In order to clearly illustrate the technical solution of the embodiments of the present disclosure or in the prior art, the drawings that need to be used in description of the embodiments or the prior art will be briefly described in the following; it is obvious that the described drawings are only related to some embodiments of the present disclosure; based on the drawings, those ordinarily skilled in the art can acquire other drawings, without any inventive work.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those ordinarily skilled in the art can obtain other embodiments, without any inventive work, which should be within the scope of the present disclosure.

Figure 1:
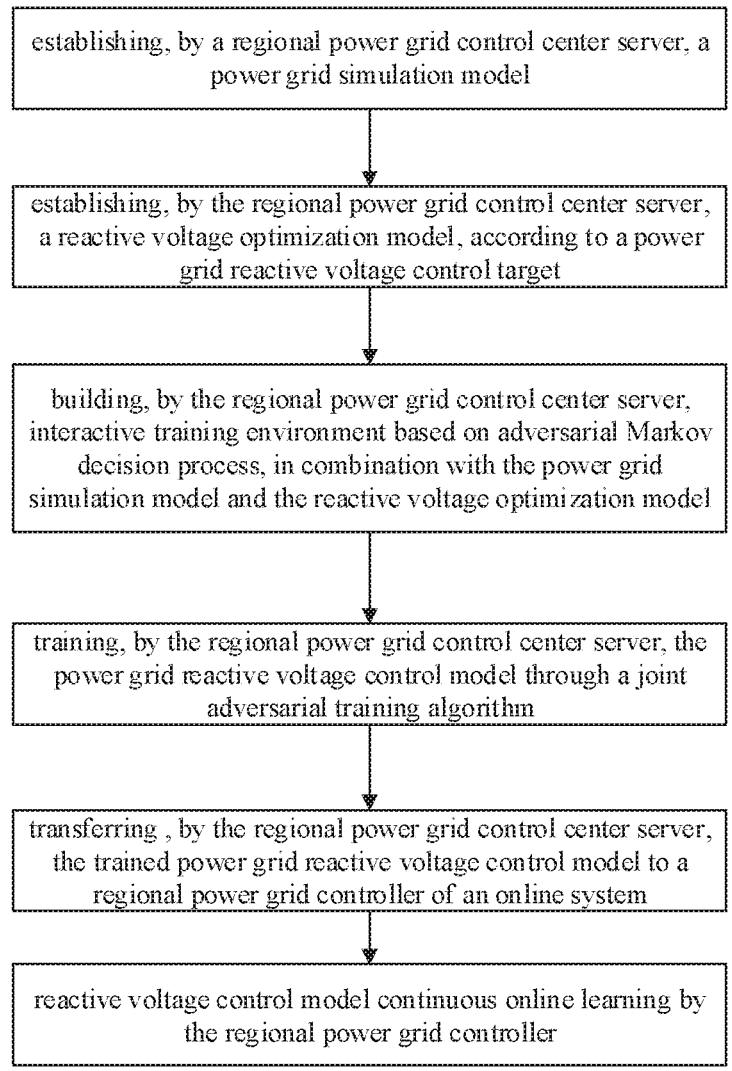
FIG. 1 shows a flow chart of a power grid reactive voltage control model training method according to embodiments of the present disclosure.

The present disclosure provides a power grid reactive voltage control model training method; exemplarily, FIG. 1 shows a flow chart of a power grid reactive voltage control model training method according to an embodiment of the present disclosure; as shown in FIG. 1, the method comprises steps of:

Step 1: establishing a power grid simulation model; the power grid simulation model including an undirected graph of a regional power grid based on n+1 nodes, a power flow equation of the power grid, power expressions of respective power grid nodes in the power grid, and power grid parameters; which is specifically as follows:

constructing an undirected graph Π(N,E), with respect to the regional power grid of n+1 nodes; where, N is a set of the power grid nodes, N=0, . . . , n; E is a set of the power grid branches, E=(i,j)∈N×N; and i, j are both power grid nodes. Constructing the power flow equation of the power grid is as follows:

$$P_{ij}=G_{ij}V_i^2-G_{ij}V_iV_j\cos\theta_{ij}-B_{ij}V_iV_j\sin\theta_{ij}, \forall ij\in E$$

$$Q_{ij}=B_{ij}V_i^2+B_{ij}V_iV_j\cos\theta_{ij}-G_{ij}V_iV_j\sin\theta_{ij}, \forall ij\in E$$

$$\theta_{ij}=\theta_i-\theta_j, \forall ij\in E \quad (1)$$

wherein, $V_i, \theta_i$ are respectively a voltage amplitude and a phase angle of the power grid node i; $V_j, \theta_j$ are respectively a voltage amplitude and a phase angle of the power grid node j; $G_{ij}, B_{ij}$ are respectively conductance and susceptance of a power grid branch ij; $P_{ij}, Q_{ij}$ are respectively active power and reactive power of the power grid branch ij; and $\theta_{ij}$ is a phase angle difference of the power grid branch ij;

with respect to the power grid node j∈N, an expression of power thereof is as follows:

$$P_j = G_{sh,i}V_i^2 + \sum_{j\in K(i)} P_{ij} = \begin{cases} -P_{Dj}, j\in N\setminus N_{IB} \\ P_{Gj}-P_{Dj}, j\in N_{IB} \end{cases}$$

$$Q_j = -B_{sh,i}V_i^2 + \sum_{j\in K(i)} Q_{ij} = \begin{cases} -Q_{Dj}, j\in N\setminus\{N_{IB}\cup N_{CD}\} \\ Q_{Gj}-Q_{Dj}, j\in N_{IB} \\ Q_{Cj}-Q_{Dj}, j\in N_{CD} \end{cases} \quad (2)$$

Where, $P_j, Q_j$ are respectively active power injection and reactive power injection of the power grid node j; $G_{sh,i}, B_{sh,i}$ are respectively ground conductance and susceptance of the power grid node i; $P_{Dj}, Q_{Dj}$ are respectively active power load and reactive power load of the power grid node j; $P_{Gj}, Q_{Gj}$ are respectively active power output and reactive power output based on a Distributed Generation (DG) of the power grid node j; $Q_{Cj}$ is reactive power output based on Static Var Compensator (SVC) of the power grid node j; $N_{IB}$ is a set of power grid nodes coupled to DG in the power grid; $N_{CD}$ is a set of power grid nodes coupled to static var compensators in the power grid; and K(i) is a set of correspondent nodes of all branches connected with the node i. In general, $N_{IB}\cap N_{CD}=\emptyset$.

Step 2: establishing a reactive voltage optimization model, according to a power grid reactive voltage control target, that is, according to a control target that can make the power grid to achieve a minimized network loss, and ensure that voltages of the respective power grid nodes are within limits, an expression being as follows:

$$\min\sum_{j\in N} P_j \quad (3)$$

$$\text{s.t. } \underline{V_i}\leq V_i\leq \overline{V_i}, \forall i\in N$$

$$|Q_{Gi}|\leq \sqrt{S_{Gi}^2-\overline{P_{Gi}}^2}, \forall i\in N$$

$$\underline{Q_{Ci}}\leq Q_{Ci}\leq \overline{Q_{Ci}}, \forall i\in N$$

Where, $\underline{V_i}, \overline{V_i}$ are respectively a lower limit and an upper limit of a voltage of the power grid node i; $\underline{Q_{Ci}}, \overline{Q_{Ci}}$ are respectively a lower limit and an upper limit of reactive power output of a static var compensator of the power grid node i; and $S_{Gi}, \overline{P_{Gi}}$ are respectively DG installed capacity and an active power output upper limit of the power grid node i.

Step 3: building interactive training environment based on Adversarial Markov Decision Process (AMDP), in combination with the power grid simulation model and the reactive voltage optimization model, which specifically includes steps of:

3.1: constructing an Adversarial Markov Decision Process state variable, with data measured by the power grid system, an expression being as follows:

$$s=(P,Q,V,t) \quad (4)$$

Where, P,Q are respectively power grid node active power and reactive power injection vectors; V is a power grid node voltage vector; and t is a time variable during training.

3.2: constructing a feedback variable, based on the reactive voltage optimization model, an expression being as follows:

$$r_t = -\sum_{i\in N} P_i(t) - C_V\sum_{i\in N}[ReLU^2(V_i(t)-\overline{V})+ReLU^2(\underline{V}-V_i(t))] \quad (5)$$

Where, $C_V$ is a voltage suppression coefficient with a typical value of 1,000; and ReLU is a nonlinear function, which is defined as: Re LU(x)=max(0,x).

3.3: constructing a reactive voltage control model action variable $a_p$, with respect to reactive power of a controllable flexible resource, e.g., reactive power of a distributed generation device and a static var compensator, etc., an expression being as follows:

$$a_p=(Q_G,Q_C) \quad (6)$$

Where, $Q_G, Q_C$ are both reactive power output vectors;

3.4: constructing an adversarial model action variable $a_o$, with respect to parameter uncertainty of the power grid simulation model, i.e., a possible range of parameter errors, for disturbing the reactive voltage control model, an expression being as follows:

$$a_o=(G,B) \quad (7)$$

Where, G, B are respectively vectors composed of conductance and susceptance of all lines.

Step 4: training the power grid reactive voltage control model through a joint adversarial training algorithm, specifically comprises steps of:

4.1: defining a reinforcement learning target function, an expression being as follows:

$$J = \sum_{t=0}^{\infty}\gamma^t(r_t+\alpha_p H(\pi_p(\cdot|s_t))+\alpha_o H(\pi_o(\cdot|s_t))) \quad (8)$$

Where, γ is a reduction coefficient with a typical value of 0.95; $\alpha_p, \alpha_o$ respectively correspond to maximum entropy multipliers of the reactive voltage control model and the adversarial model, with a typical value of 0.1; $\pi_p(\cdot|s_t), \pi_o(\cdot|s_t)$ respectively correspond to a reactive voltage control model policy function and an adversarial model policy function, which are defined as action probability distribution in a state $s_t$, and are fitted by a deep neural network; and H is an entropy function, an expression being as follows:

$$H(\pi(\cdot|s_t)) = \underset{a \sim \pi(\cdot|s_t)}{E}[-\log\pi(\cdot|s_t)] \tag{9}$$

4.2: converting forms of the reactive voltage control model policy function and the adversarial model policy function, by using reparameterization trick, expressions being respectively as follows:

$$\tilde{a}_p^\theta(s,\xi_p) = \tan h(\mu_\theta(s) + \sigma_\theta(s)\Box\xi_p), \xi_p \sim N(0,I)$$

$$\tilde{a}_o^\omega(s,\xi_o) = \tan h(\mu_\omega(s) + \sigma_\omega(s)\Box\xi_o), \xi_o \sim N(0,I) \tag{10}$$

Where, θ is a reactive voltage control model policy network parameter; ω is an adversarial model policy network parameter; $\mu_\theta(s)$ and $\sigma_\theta(s)$ are respectively a mean value and a variance function of the reactive voltage control model; $\mu_\omega(s)$ and $\sigma_\omega(s)$ are respectively a mean value and a variance function of the adversarial model; N (0,I) is a standard Gaussian distribution function; $\xi_p, \xi_o$ are respectively random variables of the reactive voltage control model and the adversarial model; and s is the Adversarial Markov Decision Process state variable.

4.3: defining and training a joint adversarial value function network $Q_\phi^\pi(s, a_p, a_o)$; where, φ represents parameters; the value function network represents an expected feedback under a corresponding state and action; and a recursive form of $Q_\phi^\pi(s, a_p, a_o)$ is obtained through a Bellman equation, an expression being as follows:

$$Q_\phi^\pi(s, a_p, a_o) = \underset{s', a_p', a_o'}{E}[R(s, a_p, a_o, s') + \tag{11}$$

$$\gamma(Q_\phi^\pi(s', a_p', a_o') - \alpha_p \log \pi_p(a_p'|s') - \alpha_o \log \pi_o(a_o'|s'))]$$

Where, s' is an Adversarial Markov Decision Process state variable at time t+1; $a'_p, a'_o$ are respectively action variables of the reactive voltage control model and the adversarial model at time t+1; and $\pi_p(a'_p|s'), \pi_o(a'_o|s')$ are respectively a reactive voltage control model action probability value and an adversarial model action probability value at time t+1.

From the above, an estimated value of $Q_\phi^\pi(s, a_p, a_o)$ can be calculated for training, as shown in (12) below:

$$y(r,s') = r + \gamma[Q_\phi^\pi(s', \tilde{a}_p', \tilde{a}_o') - \alpha_p \log \pi(\tilde{a}_p'|s') - \alpha_o \log \pi(\tilde{a}_o'|s')] \tag{12}$$

Where, $\tilde{a}'_p, \tilde{a}'_o$ are respectively estimated action variables of the reactive voltage control model and the adversarial model at time t+1.

When training the joint adversarial value function network $Q_\phi^\pi(s, a_p, a_o)$, an expression below can be used:

$$\min(Q_\phi^\pi(s', \tilde{a}_p', \tilde{a}_o') - y)^2, \tilde{a}_p' \sim \pi_p(\cdot|s'), \tilde{a}_o' \sim \pi_o(\cdot|s') \tag{13}$$

Where, φ represents parameters; $\pi_p(\cdot|s'), \pi_o(\cdot|s')$ are respectively a reactive voltage control model policy function and an adversarial model policy function at time t+1.

4.4: training the reactive voltage control model policy network, an expression being as follows:

$$\max_\theta \min_\omega \underset{\substack{s \sim D \\ \xi_p \sim N \\ \xi_o \sim N}}{E}[Q_\phi^\pi(s, \tilde{a}_p^\theta(s, \xi_p), \tilde{a}_o^\omega(s, \xi_o)) - \tag{14}$$

$$\alpha_p \log \pi_p(\tilde{a}_p^\theta(s, \xi_p)|s) - \alpha_o \log \pi_o(\tilde{a}_o^\omega(s, \xi_o)|s)]$$

Step 5: transferring the trained reactive voltage control model to an online system, which specifically comprises steps of:

5.1: undergoing multiple rounds of training as described above, until a convergence state is reached, to obtain an optimal joint adversarial value function network $Q_\phi^*$ and a current reactive voltage control model policy $\pi_p$, then stopping the training process.

5.2: using an expression below:

$$Q_\Phi^*(s, a_p) = \underset{\xi_o \sim N}{E} Q_\Phi^*(s, a_p, \tilde{a}_o^\omega(s, \xi_o)) \tag{15}$$

to marginalize the joint adversarial value function network.

5.3: deploying the reactive voltage control model policy $\pi_p$ formed by the marginalized joint adversarial value function network and the reactive voltage control model policy network to the online system.

5.4: initializing the time variable t=0; initializing an experience library D=Ø, the experience library being a set constituted by all historical experiences, and an expression of the experience library D being as follows:

$$D = \{(s_t, a_t^p, a_t^o, r_t, s_t')\}$$

Where, $s_t$ is an Adversarial Markov Decision Process state variable at time t; $a_t^p$ of is a reactive voltage control model action variable at time t; $a_t^o$ is an adversarial model action variable at time t; $r_t$ is a feedback variable at time t; and $s_t'$ is an Adversarial Markov Decision Process state variable at time t+1.

Step 6: reactive voltage control model continuous online learning, which specifically comprises steps of:

6.1: acquiring measured data from measuring apparatuses of the regional power grid to form a corresponding state variable $s_t$=(P,Q,V,t);

6.2: extracting a set of experiences from the experience library, $D_B \in D$, where B is a quantity with a typical value of 64.

6.3: updating the reactive voltage control model on $D_B$, by using Expression (13) and Expression (14).

6.4: generating an optimal action $a_t$=tan h $(\mu_\theta(s_t) + \sigma_\theta(s_t)\Box\xi) = (Q_G, Q_C)$ at time t, by using the reactive voltage control model policy network;

6.5: issuing the above-described optimal action to a controlled device through a remote adjusting system, wherein the remote adjusting system is configured to receive and execute remote adjusting commands, and to remotely adjust remote quantity control devices; and the controlled devices include distributed generation devices and static var compensators.

6.6: t=t+1, returning to step 6.1.

Figure 2:
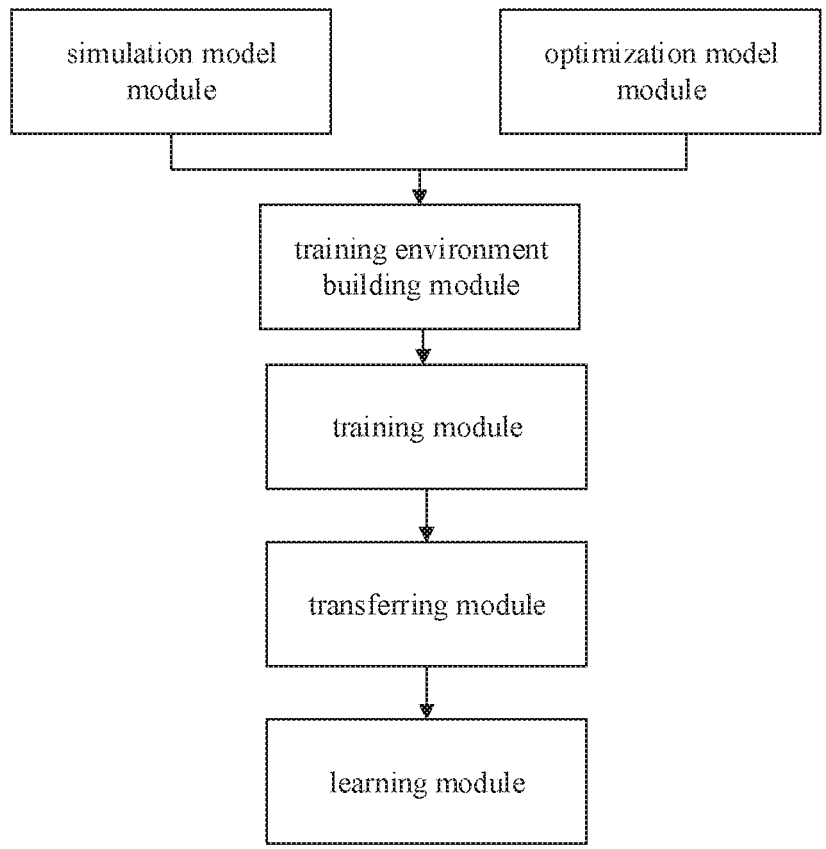
FIG. 2 shows a schematic diagram of a power grid reactive voltage control model training system according to embodiments of the present disclosure.

The present disclosure further provides a power grid reactive voltage control model training system that can implement the above-described method, as shown in FIG. 2, the system comprising: a simulation model module, an optimization model module, a training environment building module, a training module, a transferring module and a learning module. Specifically, the simulation model module is configured to establish a power grid simulation model, as the above-described step 1; the optimization model module is configured to establish a reactive voltage optimization model, according to a power grid reactive voltage control target, as the above-described step 2; the training environment building module is configured to build interactive training environment based on Adversarial Markov Decision Process, in combination with the power grid simulation model and the reactive voltage optimization model, as the above-described step 3; the training module is configured to train the power grid reactive voltage control model through a joint adversarial training algorithm, as the above-described step 4; the transferring module is configured to transfer the trained power grid reactive voltage control model to an online system, as the above-described step 5; and the learning module is configured to perform reactive voltage control model continuous online learning, as the above-described step 6.

Figure 3:
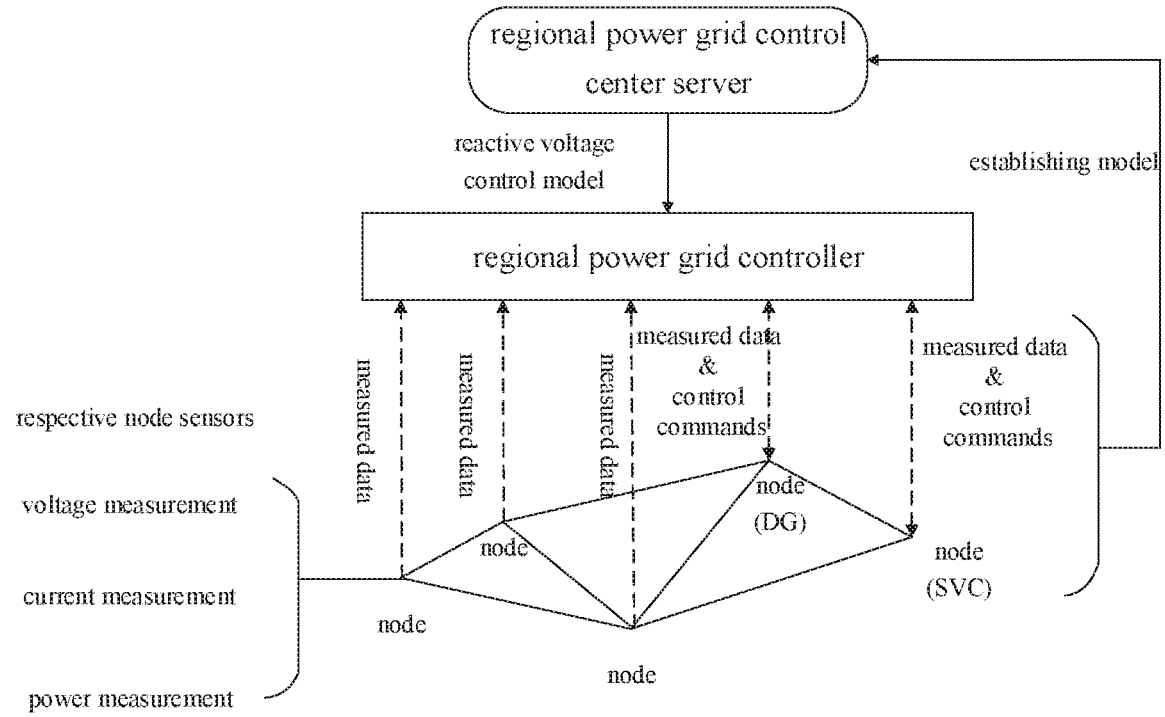
FIG. 3 shows a diagram of a power grid reactive voltage control model training architecture according to embodiments of the present disclosure.

Exemplarily, FIG. 3 shows a diagram of a power grid reactive voltage control model training architecture according to embodiments of the present disclosure, as shown in FIG. 3, comprising a regional power grid control center server, a regional power grid controller, and regional power grid; wherein, the regional power grid includes n+1 nodes, for ease of description, in this embodiment, 5 power grid nodes are taken as an example; each power grid node is provided thereon with measuring apparatuses; one power grid node or a plurality of power grid nodes may be provided with a distributed generation device or a static var compensator selectively according to the need; in this embodiment, it is selected that one power grid node therein is provided with a distributed generation device, and the other power grid node is provided with a static var compensator; a distributed generation device and a static var compensator cannot coexist on the same power grid node. It should be noted that, in an actual physical system, DG and SVC may exist on the same power grid node. Specifically, the measuring apparatuses include voltage measuring apparatuses, current measuring apparatuses, and power measuring apparatuses, wherein, the voltage measuring apparatuses are configured to measure voltage of respective power grid nodes; the current measuring apparatuses are configured to measure current of the respective power grid nodes; and the power measuring apparatuses are configured to measure active power and reactive power of the respective power grid nodes, so as to obtain active power vectors, reactive power vectors and voltage vectors of the respective power grid nodes. The measuring apparatuses may use sensors, for example, the voltage measuring apparatuses are voltage sensors, and the current measuring apparatuses are current sensors, but they are not limited thereto.

The regional power grid control center server establishes a reactive voltage control model according to the data measured by the measuring apparatuses of the respective power grid nodes in the power grid system; the reactive voltage control model establishing steps are as the above-described step 1 to step 5; the reactive voltage control model established by the regional power grid control center server will be deployed to an online system, that is, to the regional power grid controller; and the reactive voltage control model will continue online learning in the regional power grid controller. Specifically, a remote adjusting system is used for communication between the regional power grid and the regional power grid controller; and the measuring apparatuses of the respective power grid nodes in the regional power grid transmit the data measured by the measuring apparatuses, including active and reactive power injection vectors, as well as power grid node voltage vectors of the respective power grid nodes, to the regional power grid controller through the remote adjusting system; the regional power grid controller controls reactive voltage control model online learning according to the data measured by the measuring apparatuses; and the learning step is as the above-described step 6. The reactive voltage control model continues online learning, generates an optimal reactive voltage control policy, and issues the optimal reactive voltage control policy to the distributed generation devices and the static var compensators, to control the distributed generation devices and the static var compensators to perform corresponding actions.

Figure 4:
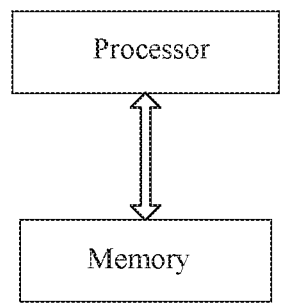
FIG. 4 shows a schematic diagram of a power grid reactive voltage control model training apparatus according to embodiments of the present disclosure.

The present disclosure further provides a computer-readable storage medium; the computer-readable storage medium stores logic instructions therein; and a processor may call the logic instructions in the computer-readable storage medium to execute the method according to the above-described embodiment, as shown in FIG. 4, taking one processor and one computer-readable storage medium as an example in FIG. 4.

In addition, the logic instructions in the above-described computer-readable storage medium may be implemented in a form of a software functional unit, and sold or used as an independent product.

The above-described computer-readable storage medium may be configured to store software programs and computer-executable programs, for example, program instructions/modules corresponding to the method according to this embodiment. The processor runs the software programs, instructions and modules stored in the computer-readable storage medium, so as to execute functional applications and data processing, that is, implement the reactive voltage control model training method according to the above-described embodiments.

The computer-readable storage medium may include a program storage region and a data storage region, wherein, the program storage region may store an operating system and an application program required by at least one function; and the data storage region may store data created according to use of a terminal device, etc. In addition, the computer-readable storage medium may include a high-speed random access memory, and may further include a non-volatile memory.

In these embodiments, by considering an error between the power grid simulation model and a real physical system model as disturbance during training, the Adversarial Markov Decision Process is established to train the adversarial model synchronously, and disturb the reactive voltage control model by using model errors, to further make the reactive voltage control model robust to model errors, so as to train a transferable deep reinforcement learning model. These embodiments make full use of internal information of the power grid simulation model, so that the obtained model may be safely and efficiently transferred to online power grid reactive voltage control, thus greatly improves efficiency and safety of the data-driven power grid reactive voltage control method, and is particularly suitable to be used in a regional power grid with a serious model incompleteness problem, which not only saves high costs of repeated maintenance of an accurate model, but also avoids the safety problem caused by online learning of the data-driven power grid reactive voltage control method, making it suitable for large-scaled promotion.

Although the present disclosure is explained in detail with reference to the foregoing embodiments, those ordinarily skilled in the art will readily appreciate that many modifications are possible in the foregoing respective embodiments, or equivalent substitutions are made for part of technical features; however, these modifications or substitutions are not intended to make the essences of the corresponding technical solutions depart from the spirit and the scope of the technical solutions of the respective embodiments of the present disclosure.

The invention claimed is:

1. A power grid reactive voltage control model training method, comprising:

establishing, by a regional power grid control center server, a power grid simulation model based on a regional power grid comprising n+1 nodes and corresponding measuring apparatuses;

establishing, by the regional power grid control center server, a reactive voltage optimization model based on data measured by the measuring apparatuses, according to a power grid reactive voltage control target;

building, by the regional power grid control center server, interactive training environment based on Adversarial Markov Decision Process, in combination with the power grid simulation model and the reactive voltage optimization model, wherein the building further comprises:

A1: constructing an Adversarial Markov Decision Process state variable, an expression being as follows:

$$s=(P,Q,V,t);$$

A2: constructing a feedback variable, an expression being as follows:

$$r_t = -\sum_{i \in N} P_i(t) - C_V \sum_{i \in N} \left[ ReLU^2(V_i(t) - \overline{V}) + ReLU^2(\underline{V} - V_i(t)) \right]$$

wherein, $C_V$ is a voltage suppression coefficient; and ReLU is a nonlinear function, which is defined as:

$$ReLU(x)=\max(0,x);$$

A3: constructing a reactive voltage control model action variable $a_p$, an expression being as follows:

$$a_p=(Q_G,Q_C)$$

wherein, $Q_G$, $Q_C$ are both reactive power output vectors; and

A4: constructing an adversarial model action variable $a_o$, an expression being as follows:

$$a_o=(G,B)$$

where, G, B are respectively vectors composed of conductance and susceptance of all lines;

training, by the regional power grid control center server, the power grid reactive voltage control model through a joint adversarial training algorithm to generate a trained power grid reactive control model, wherein the training further comprises:

B1: defining a reinforcement learning target function, an expression being as follows:

$$J = \sum_{t=0}^{\infty} \gamma^t (r_t + \alpha_p H(\pi_p(\cdot \mid s_t)) + \alpha_o H(\pi_o(\cdot \mid s_t)))$$

where, $\gamma$ is a reduction coefficient;

$\alpha_p, \alpha_o$ are respectively maximum entropy multipliers of the reactive voltage control model and the adversarial model; $\pi_p$ is a reactive voltage control model policy, $\pi_o$ is an adversarial model policy, $\pi_p(\cdot \mid s_t), \pi_o(\cdot \mid s_t)$ are respectively a reactive voltage control model policy function and an adversarial model policy function, which are defined as action probability distribution in a state $s_t$, and are fitted by a deep neural network; and H is an entropy function;

B2: converting forms of the reactive voltage control model policy function and the adversarial model policy function, by using reparameterization trick, expressions being respectively as follows:

$$\tilde{a}_p^\theta(s,\xi_p)=\tan h(\mu_\theta(s)+\sigma_\theta(s)\Box\xi_p), \xi_p \sim N(0, I)$$

$$\tilde{a}_o^\omega(s,\xi_o)=\tan h(\mu_\omega(s)+\sigma_\omega(s)\Box\xi_o), \xi_o \sim N(0, I)$$

wherein, $\theta$ is a reactive voltage control model policy network parameter; $\omega$ is an adversarial model policy network parameter; $\mu_\theta(s)$ and $\sigma_\theta(s)$ are respectively a mean value and a variance function of the reactive voltage control model; $\mu_\omega(s)$ and $\sigma_\omega(s)$ are respectively a mean value and a variance function of the adversarial model; N (0,I) is a standard Gaussian distribution function; $\xi_p, \xi_o$ are respectively random variables of the reactive voltage control model and the adversarial model; and s is the Adversarial Markov Decision Process state variable;

B3: defining a joint adversarial value function network $Q_\phi^\pi(s,a_p,a_o)$, an expression being as follows:

$$Q_\phi^\pi(s, a_p, a_o) = \underset{s', a'_p, a'_o}{E} \left[ R(s, a_p, a_o, s') + \gamma (Q_\phi^\pi(s', a'_p, a'_o) - \alpha_p \log \pi_p(a'_p \mid s') - \alpha_o \log \pi_o(a'_o \mid s')) \right]$$

wherein, s' is an Adversarial Markov Decision Process state variable at time t+1; $a'_p, a'_o$ are respectively action variables of the reactive voltage control model and the adversarial model at time t+1; $\pi_p(a'_p \mid s'), \pi_o(a'_o \mid s')$ are respectively a reactive voltage control model action probability value and an adversarial model action probability value at time t+1;

calculating an estimated value of the joint adversarial value function network $Q_\phi^\pi$; (s,$a_p$,$a_o$) as follows:

$$y(r,s')=r+\gamma[Q_\phi^\pi(s',\tilde{a}_o')-\alpha_p \log \pi(\tilde{a}'_p \mid s')-\alpha_o \log \pi(\tilde{a}_o' \mid s')]$$

wherein, $\tilde{a}'_p, \tilde{a}'_o$ –are respectively estimated action variables of the reactive voltage control model and the adversarial model at time t+1;

training the joint adversarial value function network $Q_\phi^\pi(s,a_p,a_o)$ by using an expression below:

$$\min(Q_\phi^\pi(s',\tilde{a}_p',\tilde{a}_o')-y)^2, \tilde{a}_p' \infty \pi_p(\cdot \mid s')$$

wherein, $\phi$ represents parameters; $\pi_p(\cdot \mid s'), \pi_o(\cdot \mid s')$ are respectively a reactive voltage control model policy function and an adversarial model policy function at time t+1;

B4: training the reactive voltage control model policy network, an expression being as follows:

$$\max_\theta \min_\omega \underset{\substack{s \sim D \\ \xi_p \sim N \\ \xi_o \sim N}}{E} \left[ Q_\phi^\pi(s, \tilde{a}_p^\theta(s, \xi_p), \tilde{a}_o^\omega(s, \xi_o)) - \alpha_p \log \pi_p(\tilde{a}_p^\theta(s, \xi_p) \mid s) - \alpha_o \log \pi_o(\tilde{a}_o^\omega(s, \xi_o) \mid s) \right];$$

transferring, by the regional power grid control center server, the trained power grid reactive voltage control model to a regional power grid controller of an online system, and specifically includes steps of:

C1: acquiring an optimal joint adversarial value function network $Q_\Phi^*$ and a current reactive voltage control model policy $\pi_p$;

C2: using an expression below:

$$Q_\Phi^*(s, a_p) = \underset{\xi_o \sim N}{E} Q_\Phi^*(s, a_p, \tilde{a}_o^\omega(s, \xi_o))$$

to marginalize the joint adversarial value function network;

C3: deploying the reactive voltage control model policy $\pi_p$ formed by the marginalized joint adversarial value function network and the reactive voltage control model policy network to the online system;

C4: initializing the time variable t=0; initializing an experience library D=∅, an expression of the experience library D being as follows:

$$D=\{(s_t, a_t^p, a_t^o, r_t, s'_t)\}$$

where, $S_t$ is an Adversarial Markov Decision Process state variable at time t; $a_t^p$ is a reactive voltage control model action variable at time t; $a_t^o$ is an adversarial model action variable at time t; $r_t$ is a feedback variable at time t; and $s'_t$ is an Adversarial Markov Decision Process state variable at time t+1; and performing reactive voltage control model continuous online learning in the regional power grid controller, which specifically includes steps of:

S1: acquiring by the regional power grid controller, through a remote adjusting system, measured data from measuring apparatuses of the regional power grid to form a corresponding state variable $s_t$=(P,Q, V,t);

S2: extracting a set of experiences from the experience library $D_B \in D$ where B is quantity;

S3: updating the reactive voltage control model on $D_B$;

S4: generating an optimal action $a_t$=tan $h(\mu_\theta(s_t)+\sigma_\theta(s_t)$ □ξ)=$(Q_G, Q_C)$ at time t, by using the reactive voltage control model policy network;

S5: issuing the optimal action to controlled devices through the remote adjusting system, wherein the controlled devices include distributed generation devices and static var compensators, wherein the remote adjusting system receives and executes remote adjusting commands to remotely adjust remote quantity control devices; and S6: t=t+1, returning to step S1.

2. The power grid reactive voltage control model training method according to claim 1, wherein, establishing a power grid simulation model includes:

constructing, with respect to the regional power grid of n+1 nodes, an undirected graph as follows:

$$\Pi(N,E)$$

wherein, N is a set of the power grid nodes; E is a set of the power grid branches, E=(i, j)∈N×N; and i, j are both the power grid nodes.

3. The power grid reactive voltage control model training method according to claim 2, wherein, establishing a power grid simulation model further includes:

constructing a power flow equation of the power grid as follows:

$P_{ij}=G_{ii}^2-G_iV_iV\cos\theta_{ij}-B_iV_iV_j\sin\theta_{ij}, \forall ij \in E$ $Q_{ij}=-B_{ij}V_i^2+B_{ij}V_iV_j\cos\theta_{ij}-G_iV_iV_j\sin\theta_{ij}, \forall ij \in E$ $\theta_{ij}=\theta_i-\theta_j, \forall ij \in E$ wherein, $V_i,\theta_i$ are respectively a voltage amplitude and a phase angle of the power grid node i; $V_j,\theta_j$ are respectively a voltage amplitude and a phase angle of the power grid node j; $G_{ij},B_{ij}$ are respectively conductance and susceptance of the power grid branch ij; $P_{ij},Q_j$ are respectively active power and reactive power of the power grid branch ij; and $\theta_{ij}$ is a phase angle difference of the power grid branch ij;

with respect to the power grid node j∈N, an expression of power thereof is as follows:

$$P_j = G_{sh,i}V_i^2 + \sum_{j\in K(i)} P_{ij} = \begin{cases} -P_{Dj}, j \in N \setminus N_{IB} \\ P_{Gj} - P_{Dj}, j \in N_{IB} \end{cases}$$

$$Q_j = -B_{sh,i}V_i^2 + \sum_{j\in K(i)} Q_{ij} = \begin{cases} -Q_{Dj}, j \in N \setminus \{N_{IB} \cup N_{CD}\} \\ Q_{Gj} - Q_{Dj}, j \in N_{IB} \\ Q_{Cj} - Q_{Dj}, j \in N_{CD} \end{cases}$$

wherein, $P_j,Q_j$ are respectively active power injection and reactive power injection of the power grid node j; $G_{sh,i},B_{sh,i}$ are respectively ground conductance and susceptance of the power grid node i; $P_{Dj},Q_{Dj}$, are respectively active power load and reactive power load of the power grid node j; $P_{Gj},Q_{Gj}$, are respectively active power output and reactive power output based on distributed generation device of the power grid node j; $Q_{Cj}$ is reactive power output based on a static var compensator of the power grid node j; $N_{IB}$ is a set of power grid nodes coupled to distributed generation devices in the power grid; $N_{CD}$ is a set of power grid nodes coupled to static var compensators in the power grid i; and K(i) is a set of correspondent nodes of all branches connected with the node i, $N_{IB} \cap N_{CD}=\emptyset$.

4. The power grid reactive voltage control model training method according to claim 2, wherein, the reactive voltage optimization model is as follows:

$$\min \sum_{j \in N} P_j$$

s.t. $\underline{V_i} \le V_i \le \overline{V_i}, \forall i \in N$ $|Q_{Gi}| \le \sqrt{S_{Gi}^2 - \overline{P_{Gi}}^2}, \forall i \in N$ $\underline{Q_{Ci}} \le Q_{Ci} \le \overline{Q_{Ci}}, \forall i \in N$ wherein, $\underline{V_i},\overline{V_i}$ are respectively a lower limit and an upper limit of a voltage of the power grid node i; $\underline{Q_{Ci}},\overline{Q_{Ci}}$ are respectively a lower limit and an upper limit of reactive power output of a static var compensator of the power grid node i; and $S_{Gi},\overline{P_{hdGi}}$ are respectively distributed generation device installed capacity and an active power output upper limit of the power grid node i.

5. The power grid reactive voltage control model training method according to claim 4, wherein, an expression of the entropy function H is as follows:

$$H(\pi(\cdot | s_t)) = \underset{a \sim \pi(\cdot|s_t)}{E}[-\log\pi(\cdot | s_t)].$$

6. A power grid reactive voltage control model training system, comprising:
a processor;
a memory that stores program instructions executed by the processor;
program instructions, implemented on the processor, configured to establish a power grid simulation model based on a regional power grid comprising n+1 nodes and corresponding measuring apparatuses;
program instructions, implemented on the processor, configured to establish a reactive voltage optimization model based on data measured by the measuring apparatuses, according to a power grid reactive voltage control target;
program instructions, implemented on the processor, configured to build interactive training environment based on Adversarial Markov Decision Process, in combination with the power grid simulation model and the reactive voltage optimization model, wherein the program instructions configured to build the interactive training environment further comprises:
  A1: program instructions to construct an Adversarial Markov Decision Process state variable, an expression being as follows:

$s=(P,Q,V,t);$

A2: program instructions to construct a feedback variable, an expression being as follows:

$$r_t = -\sum_{i \in N} P_i(t) - C_V \sum_{i \in N} \left[ ReLU^2(V_i(t) - \bar{V}) + ReLU^2(\underline{V} - V_i(t)) \right];$$

A3: program instructions to construct a reactive voltage control model action variable $a_p$, an expression being as follows:

$a_p=(Q_G,Q_C);$ and

A4: program instructions to construct an adversarial model action variable $a_o$, an expression being as follows:

$a_o=(G, B);$ program instructions, implemented on the processor, configured to train the power grid reactive voltage control model through a joint adversarial training algorithm to generate a trained power grid reactive voltage control model, wherein the program instructions to train further comprises:
  B1: program instructions to define a reinforcement learning target function, an expression being as follows:

$$J = \sum_{t=0}^{\infty} \gamma^t (r_t + \alpha_p H(\pi_p(\cdot|s_t)) + \alpha_o H(\pi_o(\cdot|s_t)));$$

B2: program instructions to convert forms of the reactive voltage control model policy function and the adversarial model policy function, by using reparameterization trick, expressions being respectively as follows:

$\tilde{a}_p^\theta(s,\xi_p)=\tan h(\mu_\theta)(s)+\sigma_\theta(s)\square\xi_p),\xi_p\sim N(0,I)$ $\tilde{a}_o^\omega(s,\xi_o)=\tan h(\mu_\omega(s)+\sigma_\omega(s)\square\xi_o),\xi_o\sim N(0,I);$ B3: program instructions to define a joint adversarial value function network $Q_\phi^\pi(s,a_p,a_o)$, an expression being as follows:

$$Q_\phi^\pi(s, a_p, a_o) = \underset{s',a_p',a_o'}{E} [R(s, a_p, a_o, s') + \gamma(Q_\phi^\pi(s', a_p', a_o') - \alpha_p \log \pi_p(a_p'|s') - \alpha_o \log \pi_o(a_o'|s'))];$$

program instructions to calculate an estimated value of the joint adversarial value function network $Q_\phi^\pi(s,a_p,a_o)$ as follows:

$y(r,s')=r+\gamma[Q_\phi^\pi(s',\tilde{a}_p', \tilde{a}_o')-\alpha_p \log \pi(\tilde{a}_o'|s')];$ program instructions to train the joint adversarial value function network $Q_\phi^\pi(s,a_p,a_o)$ by using an expression below:

$\min(Q_\phi^\pi(s',\tilde{a}_p',\tilde{a}_o')-y)^2,\tilde{a}_p'\sim\pi_p(\cdot|s');$ B4: program instructions to train the reactive voltage control model policy network, an expression being as follows:

$$\max_\theta \min_\omega \underset{\substack{s\sim D \\ \xi_p\sim N \\ \xi_o\sim N}}{E} [Q_\phi^\pi(s, \tilde{a}_p^\theta(s,\xi_p), \tilde{a}_o^\omega(s,\xi_0))$$
  $$- \alpha_p \log \pi_p(\tilde{a}_p^\theta(s,\xi_o)|s) - \alpha_o \log \pi_o(\tilde{a}_o^\omega(s,\xi_0)|s)];$$

and
program instructions, implemented on the processor, configured to transfer the trained power grid reactive voltage control model to an online system, wherein the program instructions to transfer further comprises the steps of:
  C1: acquiring an optimal joint adversarial value function network and a current reactive voltage control model policy $\pi_p$;
  C2: using an expression below:

$$Q_\Phi^*(s, a_p) = \underset{\xi_o\sim N}{E} Q_\phi^*(s, a_p, \tilde{a}_o^\omega(s,\xi_0))$$

to marginalize the joint adversarial value function network;
  C3: deploying the reactive voltage control model policy $\pi_p$ formed by the marginalized joint adversarial value function network and the reactive voltage control model policy network to the online system;
  C4: initializing the time variable t=0; initializing an experience library D=∅, an expression of the experience library D being as follows:

$D=\{(s_t,a_t^P,a_t^o,r_t,s_t')\}$ where, $s_t$ is an Adversarial Markov Decision Process state variable at time t; $a_t^P$ is a reactive voltage control model action variable at time t; $a_t^o$ is an adversarial model action variable at time t; $r_t$ is a feedback variable at time t; and $s_t'$ is an Adversarial Markov Decision Process state variable at time t+1; and program instructions, implemented on the processor, to perform continuous online learning in the regional power grid controller for the reactive voltage control model, which specifically includes steps of:

S1: acquiring by the regional power grid controller, through a remote adjusting system, measured data from measuring apparatuses of the regional power grid to form a corresponding state variable $s_t=(P,Q,V,t)$;

S2: extracting a set of experiences from the experience library $D_B \in D$, where B is quantity;

S3: updating the reactive voltage control model on $D_B$;

S4: generating an optimal action $a_t = \tan h(\mu_\theta(s_t) + \sigma_\theta(s_t) \square \xi) = (Q_G, Q_C)$ at time t, by using the reactive voltage control model policy network;

S5: issuing the optimal action to controlled devices through the remote adjusting system, wherein the controlled devices include distributed generation devices and static var compensators, wherein the remote adjusting system receives and executes remote adjusting commands to remotely adjust remote quantity control devices; and S6: t=t+1, returning to step S1.

7. A power grid reactive voltage control model training method, comprising:

establishing, by a regional power grid control center server, a power grid simulation model based on a regional power grid comprising n+1 nodes and corresponding measuring apparatuses;

establishing, by the regional power grid control center server, a reactive voltage optimization model based on data measured by the measuring apparatuses, according to a power grid reactive voltage control target;

building, by the regional power grid control center server, interactive training environment based on Adversarial Markov Decision Process, in combination with the power grid simulation model and the reactive voltage optimization model, wherein the building further comprises:

A1: constructing an Adversarial Markov Decision Process state variable, an expression being as follows:

$s=(P,Q,V,t)$;

A2: constructing a feedback variable, an expression being as follows:

$$r_t = -\sum_{i \in N} P_i(t) - C_V \sum_{i \in N} [ReLU^2(V_i(t) - \overline{V}) + ReLU^2(\underline{V} - V_i(t))];$$

A3: constructing a reactive voltage control model action variable $a_p$, an expression being as follows:

$a_p=(Q_G,Q_C)$; and

A4: constructing an adversarial model action variable $a_o$, an expression being as follows:

$a_o=(G,B)$;

training, by the regional power grid control center server, the power grid reactive voltage control model through a joint adversarial training algorithm to generate a trained power grid reactive control model, wherein the training further comprises:

B1: defining a reinforcement learning target function, an expression being as follows:

$$J = \sum_{t=0}^{\infty} \gamma^t (r_t + \alpha_p H(\pi_p(\cdot | s_t)) + \alpha_o H(\pi_o(\cdot | s_t)));$$

B2: converting forms of the reactive voltage control model policy function and the adversarial model policy function, by using reparameterization trick, expressions being respectively as follows:

$\tilde{a}_p^\Theta(s,\xi_p) = \tan h(\mu_\theta(s) + \sigma_\theta(s) \square \xi_p), \xi_p \sim N(0,I)$ $\tilde{a}_o^\omega(s,\xi_o) = \tan h(\mu_\omega(s) + \sigma_\omega(s) \square \xi_o), \xi_o \sim N(0,I)$;

B3: defining a joint adversarial value function network $A_\phi^{90}(s,a_p,a_o)$ an expression being as follows:

$$Q_\phi^\pi(s, a_p, a_o) = \underset{s',a'_p,a'_o}{E}$$
$$[R(s, a_p, a_o, s') + \gamma(Q_\phi^\pi(s', a'_p, a'_o) - \alpha_p \log \pi_p(a'_p|s') - \alpha_o \log \pi_o(a'_o|s'))];$$

calculating an estimated value of the joint adversarial value function network $Q_\phi^\pi(s,a_p,a_o)$ as follows:

$y(r,s') = r + \gamma [Q_\phi^\pi(s', \tilde{a}_p', \tilde{a}_o') - \alpha_p \log \pi(\tilde{a}_o'|s')]$;

training the joint adversarial value function network $Q_\phi^{90}(s,a_p,a_o)$ by using an expression below:

$\min(q_{99}^{90}(s', \tilde{a}_p', \tilde{a}_o') - y)^2, \tilde{a}_p' \sim \pi_p(\cdot|s')$;

B4: training the reactive voltage control model policy network, an expression being as follows:

$$\max_\theta \min_\omega \underset{\substack{s \sim D \\ \xi_p \sim N \\ \xi_o \sim N}}{E} [Q_\phi^\pi(s, \tilde{a}_p^\theta(s, \xi_p), \tilde{a}_o^\omega(s, \xi_0))$$
$$- \alpha_p \log \pi_p(\tilde{a}_p^\theta(s, \xi_0)|s) - \alpha_o \log \pi_o(\tilde{a}_o^\omega(s, \xi_0)|s)];$$

and transferring, by the regional power grid control center server, the trained power grid reactive voltage control model to a regional power grid controller of an online system, and specifically includes steps of:

C1: acquiring an optimal joint adversarial value function network $Q_\phi^*$ and a current reactive voltage control model policy $\pi_p$;

C2: using an expression below:

$Q_{101}^*(s,a_p) = \xi_{-N} E Q_{99}^*(s,a_p \tilde{a}_o^{107}(s, \xi_o))$ to marginalize the joint adversarial value function network;

C3: deploying the reactive voltage control model policy $\pi_p$ formed by the marginalized joint adversarial value function network and the reactive voltage control model policy network to the online system;

C4: initializing the time variable t=0; initializing an experience library $D=\emptyset$, an expression of the experience library D being as follows:

$D=\{(s_t,a_t^p,a_t^o,r_t,s_t')\}$; and performing reactive voltage control model continuous online learning in the regional power grid controller, which specifically includes steps of:

S1: acquiring by the regional power grid controller, through a remote adjusting system, measured data from measuring apparatuses of the regional power grid to form a corresponding state variable $s_t=(P,Q,V,t)$;

S2: extracting a set of experiences from the experience library $D_B \in D$, where B is quantity;

S3: updating the reactive voltage control model on $D_B$;

S4: generating an optimal action $a_t=\tan h(\|_\theta(s_t)+\sigma_\theta(s_t)\Box\xi)=(Q_G,Q_C)$ at time t, by using the reactive voltage control model policy network;

S5: issuing the optimal action to controlled devices through the remote adjusting system, wherein the controlled devices include distributed generation devices and static var compensators, wherein the remote adjusting system receives and executes remote adjusting commands to remotely adjust remote quantity control devices; and S6: t=t+1, returning to step S1.

8. The power grid reactive voltage control model training method according to claim 7, wherein, establishing a power grid simulation model includes:
constructing, with respect to the regional power grid of n+1 nodes, an undirected graph as follows:

$$\Pi(N,E)$$

wherein, N is a set of the power grid nodes; E is a set of the power grid branches, $E=(i, j)\in N\times N$; and i, j are both the power grid nodes.

9. The power grid reactive voltage control model training method according to claim 8, wherein, establishing a power grid simulation model further includes:
constructing a power flow equation of the power grid as follows:

$$P_{ij}=G_{ij}V_i^2-G_{ij}V_iV_j \cos \theta_{ij} - B_{ij}V_iV_j \sin \theta_{ij}, \forall ij \in E$$

$$Q_{ij}=-B_{ij}V_i^2+B_{ij}V_iV_j \cos \theta_{ij} - G_{ij}V_iV_j \sin \theta_{ij}, \forall ij \in E$$

$$\theta_{ij}=\theta_i-\theta_j, \forall ij \in E$$

wherein, $V_i, \theta_i$ are respectively a voltage amplitude and a phase angle of the power grid node i ; V,θare respectively a voltage amplitude and a phase angle of the power grid node j; $G_i, B_i$ are respectively conductance and susceptance of the power grid branch ij ; $P_{ij}, Q_{ij}$ are respectively active power and reactive power of the power grid branch ij ; and $\theta_{ij}$ is a phase angle difference of the power grid branch ij ;
with respect to the power grid node $j \in N$, an expression of power thereof is as follows:

$$P_j = G_{sh,i}V_i^2 + \sum_{j\in K(i)} P_{ij} = \begin{cases} -P_{Dj}, & j \in N\backslash N_{IB} \\ P_{Gj}-P_{Dj}, & j \in N_{IB} \end{cases}$$

$$Q_j = -B_{sh,i}V_i^2 + \sum_{j\in K(i)} Q_{ij} = \begin{cases} -Q_{Dj}, & j \in N\backslash\{N_{IB} \cup N_{CD}\} \\ Q_{Gj}-Q_{Dj}, & j \in N_{IB} \\ Q_{Cj}-Q_{Dj}, & j \in N_{CD} \end{cases}$$

wherein, $P_j, Q_j$ are respectively active power injection and reactive power injection of the power grid node j; $G_{sh,i}, B_{sh,i}$ are respectively ground conductance and susceptance of the power grid node i; $P_D, Q_D$, are respectively active power load and reactive power load of the power grid node j; $P_G, Q_{Gj}$ are respectively active power output and reactive power output based on distributed generation device of the power grid node j; $Q_{Cj}$ is reactive power output based on a static var compensator of the power grid node j; $N_{IB}$ is a set of power grid nodes coupled to distributed generation devices in the power grid; $N_{CD}$ is a set of power grid nodes coupled to static var compensators in the power grid; and K(i) is a set of correspondent nodes of all branches connected with the node i, $N_B \omega N_{CD} = \emptyset$.

10. The power grid reactive voltage control model training method according to claim 9, wherein, the reactive voltage optimization model is as follows:

$$\min \sum_{j\in N} P_j$$

$$\text{s.t. } \underline{V_i} \le V_i \le \overline{V_i}, \forall i \in N$$

$$|Q_{Gi}| \le \sqrt{S_{Gi}^2 - \overline{P_{Gi}}^2}, \forall i \in N$$

$$\underline{Q_{Ci}} \le Q_{Ci} \le \overline{Q_{Ci}}, \forall i \in N$$

wherein, $\underline{V_i}, \overline{V_i}$ are respectively a lower limit and an upper limit of a voltage of the power grid node i; $\underline{Q_{Ci}}, \overline{Q_{Ci}}$ are respectively a lower limit and an upper limit of reactive power output of a static var compensator of the power grid node i; and $S_{Gi}, \overline{P_{Gi}}$ are respectively distributed generation device installed capacity and an active power output upper limit of the power grid node i.

11. The power grid reactive voltage control model training method according to claim 10,
wherein, building interactive training environment based on Adversarial Markov Decision Process, wherein P,Q are respectively power grid node active power and reactive power injection vectors; V is a power grid node voltage vector; and t is a time variable during training;
wherein, $C_V$ is a voltage suppression coefficient; and ReLU is a nonlinear function, which is defined as:

ReLU(x)=max(0,x);

wherein, $Q_G, Q_D$ are both reactive power output vectors; and where, G, B are respectively vectors composed of conductance and susceptance of all lines.

12. The power grid reactive voltage control model training method according to claim 11, wherein, training the power grid reactive voltage control model through a joint adversarial training algorithm:
where, γ is a reduction coefficient; a $\alpha_p, \alpha_o$ are respectively maximum entropy multipliers of the reactive voltage control model and the adversarial model; $\pi_p$ is a reactive voltage control model policy, $\pi_o$ an adversarial model policy, $\pi_p(\cdot|S_t), \pi_o(\cdot|s_t)$ are respectively a reactive voltage control model policy function and an adversarial model policy function, which are defined as action probability distribution in a state $S_t$, and are fitted by a deep neural network; and H is an entropy function;
wherein, θ is a reactive voltage control model policy network parameter; ω is an adversarial model policy network parameter; $\mu_\theta(s)$ and $\sigma_\theta(s)$ are respectively a mean value and a variance function of the reactive voltage control model; $\mu_\omega(s)$ and $\sigma_\omega(s)$ are respectively a mean value and a variance function of the adversarial model; N (0,I) is a standard Gaussian distribution function; $\xi_p, \xi_o$ are respectively random variables of the reactive voltage control model and the adversarial model; and s is the Adversarial Markov Decision Process state variable;
wherein, s' is an Adversarial Markov Decision Process state variable at time t+1; $a'_p, a'_o$ are respectively action variables of the reactive voltage control model and the adversarial model at time t+1; $\pi_p(a'_p|s'), \pi_o(a'_o|s')$ are respectively a reactive voltage control model action probability value and an adversarial model action probability value at time t+1;

wherein, ã'$_p$, ã'$_o$ are respectively estimated action variables of the reactive voltage control model and the adversarial model at time t+1; and wherein, ϕ represents parameters; $\pi_p(\cdot|s'), \pi_o(\cdot|s')$ are respectively a reactive voltage control model policy function and an adversarial model policy function at time t+1.

13. The power grid reactive voltage control model training method according to claim 12, wherein, an expression of the entropy function H is as follows:

$$H(\pi(\cdot|s_t)) = \underset{a \sim \pi(\cdot|s_t)}{E}[-\log \pi(\cdot|s_t)].$$

14. The power grid reactive voltage control model training method according to claim 13, wherein, $s_t$ is an Adversarial Markov Decision Process state variable at time t; $a_t^p$ is a reactive voltage control model action variable at time t; $a_t^o$ is an adversarial model action variable at time t; $r_t$ is a feedback variable at time t; and $s_t'$ is an Adversarial Markov Decision Process state variable at time t+1.

\* \* \* \* \*